United States Patent [19]

Greene

[11] Patent Number: 5,414,201
[45] Date of Patent: May 9, 1995

[54] COMBINED SORBENT/CATALYST SYSTEM

[75] Inventor: Howard L. Greene, Mogadore, Ohio

[73] Assignee: The University of Akron, Akron, Ohio

[21] Appl. No.: 144,128

[22] Filed: Oct. 27, 1993

[51] Int. Cl.⁶ .............................................. C01B 7/00
[52] U.S. Cl. ................................ 588/206; 423/239.2; 423/240.5; 423/259; 423/659; 502/66; 502/74; 588/207
[58] Field of Search ............... 423/239, 240, 259, 659; 502/66, 79; 588/206, 207

[56] References Cited

U.S. PATENT DOCUMENTS

| | | | |
|---|---|---|---|
| 4,526,677 | 7/1985 | Grantham et al. | 208/262 |
| 4,623,464 | 11/1986 | Ying et al. | 210/616 |
| 4,780,287 | 10/1988 | Zeff et al. | 422/186.3 |
| 4,863,495 | 9/1989 | Rafson | 55/85 |
| 4,966,611 | 10/1990 | Schumacher et al. | 55/20 |
| 5,069,689 | 12/1991 | Goldhaar | 55/61 |
| 5,276,249 | 1/1994 | Greene | 588/206 |

*Primary Examiner*—Asok Pal
*Attorney, Agent, or Firm*—Oldham, Oldham, and Wilson, Co.

[57] ABSTRACT

A process and a sorbent/catalyst composition are described for the oxidation of volatile organic compounds. The process uses the steps of adsorbing a volatile organic compound in a first segment of a sorbent/catalyst bed at an adsorption temperature, followed by sequential heating of an opposed second segment of a sorbent/catalyst bed, downstream of the first segment, from an initial temperature to an oxidation temperature, desorbing the volatile organic compound from the first segment of the bed by heating, and cooling of the first and second segments of the bed respectively. The sorbent/catalyst contains an adsorption segment, e.g., metal oxides, unexchanged zeolites, carbon and polymeric resins, etc., and a catalytic segment for the subsequent catalytic oxidation of the compounds. The catalyst can be a metal-exchanged aluminosilicate zeolite having at least one exchanged metal, a metal-impregnated aluminosilicate zeolite having at least one impregnated metal, or a metal-exchanged, metal-impregnated aluminosilicate zeolite having at least one exchanged metal and at least one impregnated metal. Both the exchanged and impregnated metals are selected from the group consisting of Ti, V, Cr, Co, Ni, Cu, Fe, Mo, Mn, Pt and Pd.

18 Claims, 5 Drawing Sheets

COMBINED SORBENT/CATALYST SYSTEM

TECHNICAL FIELD

The invention described herein pertains generally to a combined sorbent/catalyst which removes dilute volatile organic compounds (VOCs), halogenated or not, from high volume contaminated air streams at room temperature, and then also acts as a catalyst a higher temperatures to both desorb and oxidize the trapped VOCs.

BACKGROUND OF THE INVENTION

Disposal of future VOCs and chlorinated volatile organic compounds (CVOCs), as well as cleanup of past spills which have found their way into soil and groundwater, requires a major long-term worldwide commitment. Current methods for detoxifying soil and groundwater (i.e., soil washing, retorting, pump and treat, etc.) are slow, inefficient and very costly, yet no viable in-situ or other technology has emerged to replace the prior art technology. Additionally, even after the removal of the VOCs or CVOCs, these toxic contaminants must be either concentrated or recycled, or converted into benign products prior to their release.

Current methods for recycling or conversion typically involve carbon adsorption followed by steam stripping and VOC collection or destruction using thermal or catalytic means. Illustrative of this type of collection apparatus is shown in U.S. Pat. No. 5,069,689 to Goldhast, where VOC fumes are adsorbed onto activated carbon, desorbed and oxidized in a combustion zone in the presence of oxygen. There is no mention of the ability to catalytically destroy VOCs, and the high temperatures employed in the process (500°–1,000° C.) certainly are not indicative of a catalytic process.

U.S. Pat. No. 4,966,611 to Schumacher et al., also describes a typical activated carbon bed which functions in two cycles: an adsorption cycle and a regeneration cycle. The process requires that a gas stream contact an adsorbent material during adsorption, that the adsorbent material be heated by a humidified gas during regeneration, and that the resulting compounds desorbed from the heated adsorbent material be burned in a combustion unit during regeneration. The combustion is not catalytic, and uses outside fuel such as natural gas.

Another approach is illustrated in U.S. Pat. No. 4,780,287 to Zeff et al. The VOC stream is passed through a porous bed of silica or quartz chips, and the bed is thereafter irradiated with ultraviolet light to effect a photolytic decomposition. In the event that the decomposition rate declines, the coking of the absorbent can be reversed through heating and/or passing nitrogen gas through the adsorbent bed.

Ying et al., U.S. Pat. No. 4,623,464 illustrates a combination of physicochemical and biological treatment processes, including the use of powdered activated carbon in an enhanced sequencing batch reactor. And Grantham et al., U.S. Pat. No. 4,526,677, uses activated carbon as the adsorbent, although other less active, and less selective adsorbents such as coconut charcoal, petroleum coke or devolatized and activated coal may also be used. Polymeric carbonaceous materials were also believed to be effective.

However, these prior art approaches are energy and equipment intensive, requiring multiple adsorption beds, the capability for feed switching and steam stripping, as well as facilities for continuous heating of large gas volumes. It has been estimated that groundwater treatment plants could save 30–40% in traditional capital and operating costs if separate parallel carbon beds and associated CVOC conversion facilities and services were made unnecessary.

What has been needed in the prior art is an a medium which is capable of acting both as a sorbent for VOCs and/or CVOCs, and as a catalyst for the subsequent oxidative destruction of such adsorbed material with a catalyst which in a preferred embodiment would include an exchanged and impregnated zeolite-based catalytic medium which is uniquely active, selective and stable during VOC and/or CVOC oxidation. One of the key features would be the ability to act as a molecular sieve, pulling out large quantities of volatiles at ambient temperature. With periodic increases in temperature, the collected CVOCs would not only desorb from the catalyst bed, but also simultaneously be catalytically oxidized, thereby eliminating the need for carbon beds.

SUMMARY OF THE INVENTION

In accordance with the present invention, there is provided a single bed sorbent/catalyst system which functions both to physisorb VOCs or CVOCs, the two terms being used interchangeably throughout the specification, at ambient temperature, and subsequently desorb and simultaneously oxidize the adsorbed compounds to higher oxygenated products, without the need for a separate regeneration period while not on-stream.

It is an object of this invention to provide a single medium which can function both as an adsorbent and as a catalyst.

It is another object of this invention to provide a sorbent/catalyst system which first acts as a sorbent to collect low concentration VOCs or CVOCs at room temperature and then act as a catalyst at higher temperatures (e.g., 350° C.) to destroy and/or oxidize the VOCs.

It is a still further object of this invention to provide a sorbent/catalyst system which avoids the energy loss from continuously heating dilute, high volume streams, through a cycling of the adsorbent phase and catalytic phase.

It is yet another object of this invention to permit long unattended adsorption cycles followed by short desorption reaction cycles.

It is still yet another object of this invention to eliminate the need for parallel beds.

These and other objects of this invention will be evident when viewed in light of the drawings, detailed description, and appended claims.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
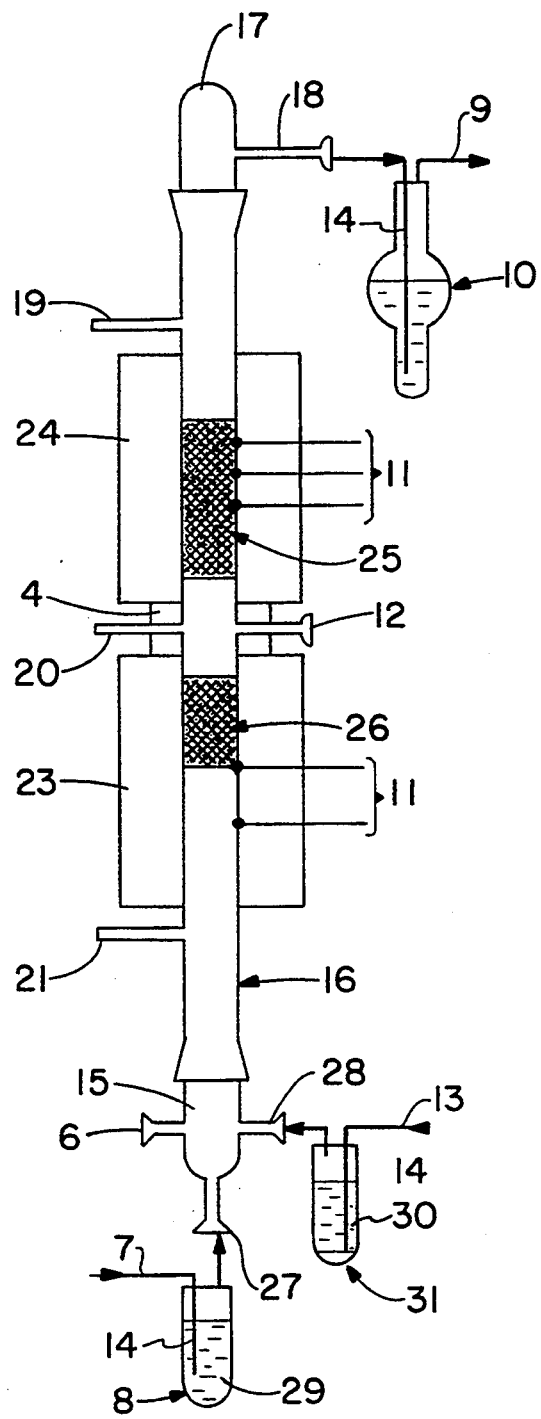
FIG. 1 is a side view in partial cross-section of a dual bed reactor suitable for sorption and catalytic oxidation of physisorbed VOCs and CVOCs.

The dual function sorbent/catalyst medium is capable of trapping volatile organic compounds (VOCs) or halogenated, particularly chlorinated, volatile organic compounds (CVOCs) at about ambient temperature, while also catalyzing their destruction and desorbing the products at elevated temperatures (~350° C.). Such a system eliminates the need for separate carbon adsorption beds and substantially reduces energy consumption.

In general, the sorbent/catalyst unit will normally operate at ambient temperature during the adsorption cycle, removing VOCs (halogenated or not), from for example, a stripping tower effluent air stream. It is certainly envisioned that depending upon the composition of the sorbent/catalyst, the adsorption temperature may be either higher or lower than ambient temperature, depending upon the specific characteristics of the sorbent/catalyst. At a time close to breakthrough, the sorbent/catalyst unit would be programmed to oxidize the trapped organics by being heated progressively in the axial direction, starting at the VOC-free end. As heating moved predictably down the sorbent/catalyst unit, the CVOC would be desorbed and carried, by continued passage of the contaminated air stream, to the active hot effluent end where the exposed catalyst surface sites would convert it into deep oxidation products.

During this reactive portion of the cycle, care is taken to maintain the CVOC desorbing rate lower than the total oxidizing capacity of the available catalyst sites at any given time. As more catalyst surface is progressively freed of physisorbed CVOC, desorption, and subsequent oxidation rates, can be increased, limited only by the potential for local overheating and subsequent deactivation of the catalyst. At the completion of the reactive portion of the cycle, axial reactor heating is programmed to progressively retreat toward the effluent end of the reactor such that the cool portions of the sorbent/catalyst again act as a trap to physisorb incoming CVOCs. In a sophisticated operating environment, the whole trapping/reacting cycle is programmed to automatically repeat without significant manual interference.

In a first embodiment of this invention, the sorbent/catalyst of this invention comprises a metal-exchanged, metal-impregnated zeolite or molecular sieve catalyst for the destruction of halogenated organics, said catalyst being supported or unsupported, comprising from 0 weight percent, hereinafter wt. %, to about 95 wt. % of a binder, from about 10 wt. % to about 95 wt. % of a metal-exchanged zeolite, and from about 0.2 wt. % to about 12 wt. % of an impregnating metal compound, said percentage being calculated as the metal loading on an oxide basis, where the metal in the metal-exchanged zeolite can be selected from the representative and illustrative group consisting of Ti, V, Cr, Co, Ni, Cu, Fe, Mo, Mn, Pt and Pd and the impregnating metal compound can be selected from the representative and illustrative group consisting of compounds of Ti, V, Cr, Mn, Fe, Co, Ni, Cu, Mo, Pd, and Pt Additionally disclosed is a process for making said catalysts and a process for the oxidative destruction of hazardous halogenated organics including chlorinated hydrocarbons, fluorinated hydrocarbons, and fluorochloro carbons (CFC's) which comprises oxidizing the halogenated organics in the presence of said catalyst and the excess of oxygen or an oxygen containing gas mixture such as air.

The optional binder can be selected from the representative and illustrative group consisting of alumina, silica, alumina-silica, cordierite, titania, zirconia, vanadia, and other inorganic materials used as binding agents. However when present, binders such as Silbond ™ or other binders which form high surface area matrices are preferred. While not wishing to be bound by theory, it is believed that the binder, when present, will act as a bonding agent to secure the metal-exchanged zeolite onto the support, and also acts as a surface which will bond with the impregnating agent.

The metal in the metal-exchanged zeolite can be selected from the representative and illustrative group consisting of Ti, V, Cr, Co, Ni, Cu, Fe, Mo, Mn, Pt and Pd. The impregnating metal compound can be selected from the representative and illustrative group consisting of compounds of Ti, V, Cr, Mn, Fe, Co, Ni, Cu, Mo, Pd, and Pt Typically, the impregnating metal compound is a water soluble metal compound where the metal is available as an ion in any allowable oxidation state. When the catalyst is deposited on a support, the support can be made of any standard support material such as, but not restricted to, alumina, silica, silica-alumina, cordierite, titania, zirconia, other similar inorganic supports and extrudates containing zeolites. The support can be in any desirable shape including, but are not restricted to, honeycomb, monolith, pellets, tings, spheres, saddles, ceramic foams, extrudates, or other types of shaped support. Honeycombs and monoliths are preferred.

In a second embodiment of this invention, the sorbent/catalyst composition is varied compositionally in an axial direction from a composition which emphasizes the adsorption functionality at the feedstock side of the catalyst (first segment), to a second segment which emphasizes the oxidation functionality at the opposed effluent side of the catalyst. The composition of the catalyst varies in either a uniform or non-uniform manner from either of the two extremes. In this system, the preferred adsorption composition in the first segment of the catalyst bed is typically a zeolite or molecular-sieve type composition which may or may not have any exchanged or impregnated metals attached or physisorbed thereto. At the second segment of the sorbent/catalyst bed, the composition emphasizes the oxidative functionality, which in a preferred embodiment, will include the metal-exchanged, metal-impregnated aluminosilicate zeolite or molecular sieve which has been described previously.

Catalyst Preparation

In a first catalyst preparation embodiment of the invention, the metal-exchanged, metal-impregnated zeolite or molecular sieve, the terms being used interchangeably in this application, of the instant invention can be prepared by a process which comprises the steps of: (1) exchanging a zeolite with a metal to form a metal-exchanged zeolite; (2) drying the metal-exchanged zeolite; (3) calcining the metal-exchanged zeolite, (4) optionally adding a binder to the metal-exchanged zeolite; (5) drying the metal-exchanged zeolite/binder combination, if the binder is present; (6) calcining the metal-exchanged zeolite/binder combination, if the binder is present; (7) impregnating the metal-exchanged zeolite to form a metal-exchanged zeolite, metal-impregnated catalyst; (8) drying the metal-exchanged, metal-impregnated catalyst; and (9) calcining the metal-impregnated, metal-exchanged zeolite catalyst to form an active catalyst for the destruction of halogenated organics.

In a second catalyst preparation embodiment of the invention, the metal-exchanged, metal-impregnated zeolite of the instant invention can be prepared by a process which comprises the steps of: (1) exchanging a zeolite with a metal to form a metal-exchanged zeolite; (2) drying the metal-exchanged zeolite; (3) calcining the metal-exchanged zeolite, (4) washcoating the metal-exchanged zeolite catalyst onto an inorganic support with or without a binder, (5) drying the washcoated metal-exchanged zeolite/support combination; (6) calcining the washcoated metal-exchanged zeolite/support combination; (7) impregnating the metal-exchanged washcoated zeolite/support to form a metal-exchanged zeolite, metal-impregnated catalyst; (8) drying the metal-exchanged, metal-impregnated catalyst; and (9) calcining the metal-impregnated, metal-exchanged zeolite catalyst to form an active catalyst for the destruction of halogenated organics.

In a third catalyst preparation embodiment of the invention, the metal-exchanged, metal-impregnated zeolite of the instant invention can be prepared by a process which comprises the steps of: (1) exchanging a zeolite with a metal to form a metal-exchanged zeolite; (2) drying the metal-exchanged zeolite; (3) calcining the metal-exchanged zeolite, (4) dry-mixing the metal-exchanged zeolite powder with a finely powdered impregnating metal compound, (5) adding a binder to form a metal-exchanged zeolite, finely powdered impregnating metal compound powder/binder slurry, (6) drying the metal-exchanged zeolite, finely powdered impregnating metal compound/binder slurry; and (7) calcining the metal-exchanged zeolite, finely powdered impregnating metal compound catalyst to form an active catalyst for the destruction of halogenated organics.

Zeolitic Catalyst Metal-Ion Exchange Process

Exchanging a zeolite with a metal, which is typically a water soluble metal salt with the metal available as an ion, to form a metal-exchanged zeolite, normally involves first treating the zeolite with ammonia in an aqueous environment to convert protonic sites to ammonium sites; the ammonium sites facilitating the metal exchange reaction. Normally, water soluble metal salts are used in the exchange reaction because the exchange reaction involves the replacement or exchange of one ion for another ion in the channels or cages of the zeolite. The exchange process is normally carded out until exchange equilibrium is attained which can range from about six hours to about 24 hours or more, with 10 to 20 hours being preferred.

Metal-Exchanged Zeolite Catalyst Washcoating

Washcoating is a technique for surface deposition of an active catalyst species onto the surface of an inert support. The coating technique is normally performed by dipping a support in a slurry of the active catalyst and optionally a binder. The binder, when necessary, allows efficient adherence of the catalytic agent to the support surface. Drying and calcining completes the washcoat bonding process resulting in a surface coated support. Of come, it should be recognized that the coverage of the surface will not be complete, and second, that pores formed by the binder can expose zeolite or support.

The amount of the catalytic composition, washcoated or otherwise bonded to the surface of a given support, will depend in a large part on the end use of the particular supported catalysts. However, typically, the catalyst composition does not make up more than 50% of the weight of the final catalyst, i.e., 50% catalyst and 50% support. Preferably, the catalyst compositions make up no more than 25% of the combined weight. However, supported catalysts can be made where the catalyst composition makes up more than 50% of the weight or less than 25% of the weight.

Metal-Ion Exchanged Zeolite Catalyst Impregnation

Impregnation is a technique where a surface is saturated with a metal ion. The impregnating metal compound can be selected from the representative and illustrative group consisting of compounds of Ti, V, Cr, Mn, Fe, Co, Ni, Cu, Mo, Pd, and Pt Typically the impregnating metal compound can be any reagent containing the desired metal in a usable form, such as, but not restricted to, water soluble salts of these metals where the metal ion is in any chemically allowable oxidation state. The impregnation involves immersion or soaking of the washcoated catalyst in a solution containing the impregnating metal compound, and optionally a binder. The impregnated catalyst is then subjected to a drying and a calcining step. The impregnation step is normally performed in an aqueous medium which requires the impregnating metal compound to be water soluble to some extent Previously exchanged metal ions are neither lost nor are they replaced during this impregnation process. Furthermore, impregnation sites yield very different catalytic properties from metal-exchanged sites.

Metal-Exchanged, Metal-Impregnated Zeolitic Catalyst Drying

The drying steps are well known drying and are typically performed at a temperature sufficient to promote drying and for a time sufficient to attain drying at a given temperature. Of come, there is an inverse relationship between temperature of drying and time of drying, i.e., as the temperature goes up the time of drying goes down. However, too rapid a drying rate can adversely affect ultimate catalyst properties. Thus, the time and temperature of drying are typically balanced to give the best overall properties. In the present invention, the drying time is usually from about 2 hours to about 48 hours or longer and the drying temperature is usually from about 95° C. to about 250° C. The dried catalyst is then calcined at a temperature from about 400° C. to about 750° C. for a time sufficient to render the catalyst in a stable form from about 2 hours to about 48 hours or longer. Since zeolites are involved, temperatures much above 750° C. may cause destruction of the crystalline nature of the zeolite. The thermal destruction of synthetic zeolite is well known in the art.

Non-Supported Catalysts

There are several methods which can be employed to prepare non-supported metal-exchanged, metal-impregnated catalysts. In one embodiment, commercially available zeolite pellets are exchanged with appropriate metal ions. Subsequent to appropriate drying and calcining, these metal-ion exchanged zeolite pellets, are impregnated with a suitable impregnating agent, and optionally with a binder. After appropriate drying and calcination steps, followed by sieving to appropriate screen size, a non-supported catalyst has been prepared.

In a second embodiment, commercially available zeolite powders are exchanged with appropriate metal ions. Subsequent to appropriate drying and calcining, these metal-ion exchanged zeolite powders, are dry-mixed with a suitable finely powdered impregnating metal compound and slurried with a binder. After appropriate drying and calcination steps, followed by sieving to appropriate screen size, a non-supported catalyst has been prepared.

In a third embodiment, non-supported catalysts can also be prepared by simply taking the catalytic mixture (metal-impregnated and metal-exchanged zeolite) and shaping the mixture into a form in a wetted state (inclusion of sufficient water to render the mixture formable, i.e., not too fluid or not too dry, as is well known in the art), and drying and calcining the form. This process results in a stable, unsupported catalyst. This method may also require the inclusion of extrusion aids such as inorganic or organic plasticizers well known in the art or pore forming additives also well known in the art.

In yet a fourth embodiment, non-supported catalysts can be prepared by a method which involves the preparation of a ceramic foam, comprising a mixture of the metal-impregnated and the metal-exchanged zeolite. Thus, the above mixture is sprayed or otherwise coated onto an organic form. The coated form is dried and then calcined, which destroys the organic form, leaving behind a ceramic remnant of the organic form, i.e., a ceramic foam. It should be recognized that other techniques well known in the art can also be used to form the unsupported catalyst of the present invention.

Ion Exchange/Impregnation Reagents

The specific type of metal reagents which can be used for either exchanging the zeolite or for impregnating the catalysts include, but are not restricted to, chlorides including all possible chlorides of each metal, oxides, phosphates, sulfates, acetates, formates, nitrates, bromides, carbonates, hydroxides, and other similar water soluble salts of metals selected from the representative and illustrative group consisting of Ti, V, Cr, Mn, Co, Ni, Cu, Fe, Mo, Mn, Pd and Pt. However, it should be recognized that non-aqueous methods can also be employed to exchange the zeolite or impregnate the washcoated support.

Zeolites

The zeolites or molecular sieves, the terms being used interchangeably, usable in this invention include pellets and powders, such as Na-Y and H-Y, and are commercially available from Union Carbide, Linde Division, under the tradename Y-52, and Y-82 respectively. However Y-zeolites from any other manufacturer can be utilized under similar conditions, along with other types of zeolites, such as A, L, 0, P or X zeolites, silicalites, ZSM series, or naturally occurring zeolites such as faujasites or mordenites.

Supports

A variety of supports can be used as substrates for the catalysts of the present invention. The supports include, but are not restricted to, typical inorganic supports such as alumina, aluminum oxide, silica, silicates, silica-aluminas, aluminum-silicates, titanias, cordierite and other similar supports and combinations thereof. These inorganic supports can be in any number of shapes and structures depending on the exact requirements of the reactor or process in which they will be incorporated. In one embodiment of the invention, a preferred support shape is the honeycombed type shape. Each honeycomb pattern selected is again a matter of discretion depending to a large extent on the reactor and process variables. Other shaped forms are also usable including, but not restricted to, spheres, Intalox TM saddles, Super Intalox TM saddles, Berl saddles, slotted ring Tower Packing TM, Raschig Rings TM, cross-partition rings, Lessing tings, balls, pellets, bricks, ceramic foams and monoliths. It has also been possible to use metals, such as stainless steel as a support material. Depending upon reaction temperatures employed, it is also possible to use polymeric support material, such as Dowex ® resins and Amberlite ® resins.

Sorbents

The sorbents which are applicable to this invention are capable of physisorbing VOCs or CVOCs in a reversible manner. Typical examples of such sorbents, but not being restricted to such list would include: metal oxides, e.g., alumina, silica gel, titania, zirconia, etc.; unexchanged zeolites, e.g., H-Y, H-ZSM-5, etc.; carbon, e.g., activated carbon, charcoal, etc.; and polymeric resins, e.g., Amberlite ® resins which would include insoluble crosslinked polymers in minute bead for, available in strong acid, weak acid, strong base, and weak base form, each having various grades differing in exchange capacity and porosity, for remving simple and complex cations and anions from aqueous and non-aqueous solutions, Dowex ® resins which would include synthetic ion-exchange resins made from styrenedivinylbenzene copolymers, having a large number of ionizable or functional groups attached to the hydrocarbon matrix, the functional group determining the chemical behavior and type of ion-exchange resin, etc.

Reactants

The types of halogenated organics for which the novel catalysts of this invention are able to oxidize include, but are not restricted to, the following: chlorinated hydrocarbons such as chlorinated methanes including chloromethane, dichloromethane, chloroform, carbon tetrachloride; chlorinated ethane including chloroethane, dichlomethane, trichloroethane, tetrachloroethane and higher chlorinated ethanes; other chlorinated alkanes; chlorinated ethylenes including monochloroethylene, dichloroethylene, trichlomethylene, and tetrachloroethylene; chlorinated propylene and other chlorinated alkenes and dienes; chlorinated aromatics including chlorinated benzenes; perchlorinated hydrocarbons including hexachlorobenzene, hexachlorobutadiene, hexachloroethane, chlorinated styrenes, dioxin, polychlorinated biphenyls, and other chlorinated hydrocarbons and organics; fluorinated hydrocarbons from gaseous to high molecular weight ones, such as fluorinated methanes including fluoromethane, difluoromethane, fluoroform, carbon tetrafluoride; fluorinated ethylene, 1-fluomethylene, difluoroethylene, tri and tetra fluoroethylene; chlorinated/fluorinated hydrocarbons such as freons including difluorodichlomethane, fluorochloropropanes, CFC-12, CFC-11, CFC-113 and other similar CFC's, such as H-CFC's.

Multiple Ion Exchange and/or Impregnation

It should be appreciated that there are at least 15 different combinations of metals which are possible for catalysts having one metal-exchanged in the zeolite and a second, the same or different, impregnated on the surface. It should also be appreciated that trimetallic compositions are also possible by either using two different metals during exchange or during impregnation. Four metal and higher mixed metal combinations are also possible.

Water Vapor Addition

Applicants have also found that the addition of water to the feed stream in an amount below the supersaturation point at the given temperature and pressure of the feed stream, is capable of effectively shifting the equilibrium concentration of chlorine gas produced during oxidation to hydrochloric acid according to the Deacon reaction shown below:

$$4HCl + O_2 \rightleftharpoons 2H_2O + 2Cl_2$$

The invention will be made more clear by reference to an illustrative group of examples which describe the preparation of the catalyst and describe the types of results which are common in the use of these catalysts for the destruction of halogenated organics. All parts and percentages are by weight unless otherwise indicated.

Abbreviations

In the examples below, the following abbreviations will be used:

| | |
|---|---|
| CA | chromic acid |
| TCE | trichloroethylene |
| Silicalite | silicalite-type zeolite |
| Silicalite/CA | silicalite-type zeolite impregnated with CA |
| Cr—Y | chromium exchanged Y-type zeolite |
| Cr—Y/Pt | chromium exchanged, platinum impregnated Y-type zeolite |
| Cr-ZSM-5 | chromium exchanged, ZSM-5 type zeolite |

Preparation of Cr-Y Catalyst

The H-Y catalyst in the form of 1/16" pellets was first exchanged to the ammonium form before chromium exchange. An ammonium chloride solution (2.24 equivalent) was prepared by dissolving 120.5 g ammonium chloride in 1 liter of distilled water. 150 g of H-Y pellets were suspended in this solution and the solution stirred continuously at 50°–55° C. for 2 hr. Three such successive exchanges were performed on H-Y to ensure an ammonium exchange of about 70%.

For the chromium exchange, 25 g of chromium nitrate $(Cr(NO_3)_3 \cdot 9H_2O)$ was dissolved in 1 liter of distilled water to have a 0.3% (by weight) chromium concentration. This solution, which had a pH of 2.58, was neutralized to a pH of 4.0 by adding 1N $NH_4OH$. The $NH_4$-Y was then suspended in this solution and stirred continuously at 90° C. for 72 hours. After the exchange, the catalyst pellets were thoroughly washed and dried at 125° C. for 90 min and then calcined at 500° C. for 12 hr to prepare the Cr-Y catalyst.

Platinum Impregnation

The impregnation of platinum on Cr-Y was done by the method of incipient wetness. A Pt loading of 0.2% Coy weight) was obtained, based on the solution uptake. 0.02 g of tetraamine platinum (II) chloride was dissolved in 10 ml of distilled water and 9.98 g of Cr-Y was wetted by this solution. The catalyst was then dried at room temperature and was calcined at 500° C. (by gradual heating to this temperature, 1° C./min) for 12 hr to prepare Cr-Y/Pt.

Platinum Impregnation

The exchange of platinum on a previously exchanged Cr-Y zeolite was accomplished as follows. 0.03 g of tetraamine platinum (II) chloride was dissolved in 100 ml of distilled water. 9.97 g of Cr-Y was suspended in 900 ml of distilled water and the 100 ml of platinum solution was added dropwise. The solution was continuously stirred at room temperature for 12 hr. The catalyst was then washed with distilled water twice and then dried at room temperature. Calcination was then carried out at 500° C. (by gradual heating to this temperature, 1° C./min) for 12 hr to prepare the Cr-Pt-Y catalyst.

Cobalt Impregnation

For the impregnation of cobalt on Cr-Y catalysts, 50 g of $Co(NO_3)_2 \cdot 6H_2O$ was dissolved in 400 ml of distilled water. 20 g of Cr-Y was then suspended in this cobalt solution for 2 hr. The catalyst was then dried at 125° C. for 90 min and then calcined at 500° C. for 12 hr to prepare the Cr-Y/Co catalyst.

Preparation of Silicalite/CA Catalyst

The first step in the preparation of Silicalite/CA was to obtain Silicalite pellets from Silicalite powder using a silica-based binder, Silbond-H6C, (a prehydrolyzed ethyl silicate). 20 ml of the binder was added to 32 g of the powder to obtain a thick paste. This was kept in a furnace at 200° C. for 2 hr., followed by ramped heating to 500° C. for 8 hrs. with subsequent crashing into 1/16" size pellets. Silicalite pellets were then impregnated using a 30% chromic acid solution (30 g of $CrO_3$ in 100 g of water) for 2 hrs. at room temperature. The impregnated pellets were later dried at 100° C. for 2 hrs. and calcined at 500° C. for 8 hrs. The final $Cr_2O_3$ impregnation level was approximately 9%.

Preparation of Cr-ZSM-5

About 15 g of ZSM-5, obtained from UOP (lot #15228-72, 1/16" pellets), were exchanged with 2.24M ammonium chloride slution. This exchange was carried out three times, each of two hours duration, at room temperature. The final ammonium exchanged catalyst was then exchanged with 2 wt. % chromium nitrate solution. The pH of the solution was maintained at 4.0 by adding a few drops of ammonium hydroxide. The exchange was carded out for 72 hrs. at 50° C. The chromium exchanged catalyst was washed with distilled water until the pH of the washed sample was the same as that of the distilled water, to ensure that the catalyst was free of any impregnated chromium. The catalyst was then dried initially at 125° C. for 90 minutes and calcined at 500° C. for 12–18 hours.

Experimental Description

Referring now to the drawings wherein the showings are for purposes of illustrating the preferred embodiment of the invention only and not for purposes of limiting the same, the Figures show experimental configurations for using a sorbent/catalyst medium and typical operating conditions which are applicable to the same.

Figure 2:
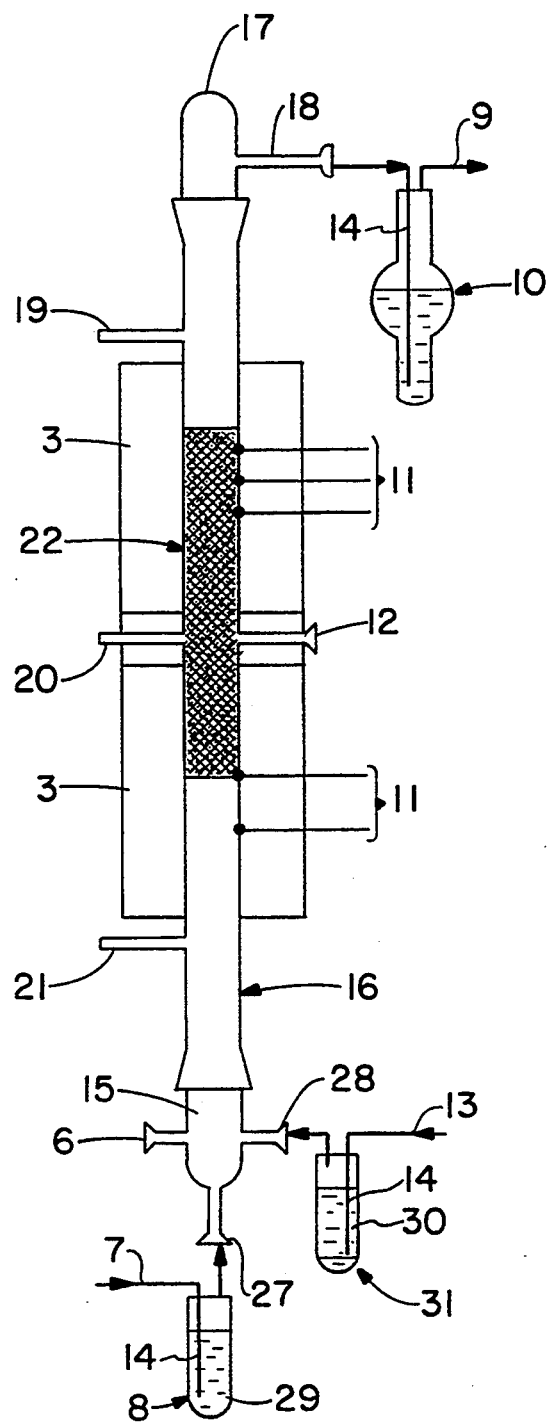
FIG. 2 is side view in partial cross-section of a single bed reactor suitable for sorption and catalytic oxidation of physisorbed VOCs and CVOCs.

FIG. 1 shows a reactor 16 which contains a sorbent-/catalyst medium 25,26 within the reactor, the shape of which is generally tubular. Tubular reactors are preferred for their ease of insertion into a receiving bore in a furnace, although there are in general, no geometric shape limitations to the cross-section of the reactor. Surrounding the reactor is a suitcase-type furnace 23,24 which can encompass the sorbent/catalyst 25,26 contained within the reactor 16, but need not be limited to such as shown in FIG. 2, where a single sorbent-/catalyst 22 is shown enclosed by a single suitcase-type furnace. The experimental results were derived with a two suitcase-type furnace arrangement, for ease of experimental simplicity. The furnaces 23,24 were equipped with internal resistance coils (not shown) which permitted control of the temperature of the furnaces. In sophisticated furnace construction, multiple resistance coils with individual temperature control would be positioned axially within each reactor, although this level of sophistication is not necessary. At various points in the furnace, thermocouples 11 were provided to permit temperature monitoring. The gap between upper and lower reactor furnaces, was typically wrapped with heating tape and insulation 4. A manometer tap 12 additionally extended from this portion of the reactor. A slight vacuum was typically pulled on the reactor system effluent so as to permit the investigation of the sorbent/catalyst system in the absence of any associated pressure effects. There typically was a slight positive pressure drop across the reactor due to the catalyst packing and/or glass reactor flits. The existence of a postive partial pressure is well-known in the art in a reactor configuration such as that described. The use of positive and negative pressures in this reaction are contemplated within the scope of this process.

Reactor 16 is fed via mixing chamber 15 which serves as the inlet for air inlet 6, CVOC effluent inlet 27, and water vapor inlet 28. For ease of convenience in feeding a chlorinated volatile organic compound, CVOC uptake air 7 is fed via diptube 14 into a CVOC liquid 29 which is held at a constant temperature in a bubbler 8. Through control of the CVOC temperature and CVOC uptake air rate, a predetermined amount of CVOC is fed into mixing chamber 15 as would be indicated by the Clapeyron equation. Similarly, predetermined amounts of water vapor 28 are fed into mixing chamber 15 via the controlled addition of nitrogen and/or air 13 saturation via water bubbler 31 through dip tube 14 into water 30 held at a constant temperature.

In order to permit the selective sampling of the composition of the feed and effluent streams in the reactor, various sampling ports are provided in the reactor. A bottom sampling port 21 permits the monitoring of the composition of the feedstream. Middle sampling port 20 permits detection of breakthrough CVOC, thereby indicating the need for the activation of the upper catalytic bed 25 and upper reactor furnace 24, followed by subsequent heating of the lower catalyst bed 26 via lower reactor furnace 23. An upper sampling port 19 is provided to indicate the composition of the effluent of the reactor.

In order to remove corrosive HCl vapor from the effluent, reactor 16 is terminated with an end cap 17 equipped with an exit port 18 which feeds the effluent into an aqueous bubbler 10 via dip tube 14 which absorbs HCl and acidities the water, but minimizes the "acid" rain component of the final effluent 9. It is appreciated that there are several other ways possible to remove HCl vapor, and that this method is merely illustrative of one type of removal technique.

While the reactor configuration is the best known at the present time, additional reactor designs are contemplated as fully being within the scope of this invention. As shown in FIG. 2, a single sorbent/catalyst 22 enclosed by a single suitcase furnace 3 is believed to be a viable alternative. Additionally, alternative methods of feeding CVOCs and water vapor are also envisioned such as by using syringe pumps, tubing pumps or other mechanized means of feeding the liquid into the reactor with prior volutilization of the liquid.

Process Conditions

Referring to FIG. 1, the catalyst/sorbent medium enclosed in the reactor(s) is operated by allowing the lower unit to function as a sorption unit while the upper unit acts as a catalysis unit. TCE ($\sim$1,100 ppm) in the presence of water vapor ($\sim$14,000 ppm) was used as the feedstream. The adsorption of TCE in the lower bed was allowed to proceed at room temperature while the composition of the initial feedstream was monitored via the bottom sampling port and the composition of the sorption effluent stream was monitored by way of the middle sampling port. At the onset of breakthrough in the lower adsorption unit, the upper bed was heated to reaction temperature ($\sim$350°–450° C.) with temperature monitoring marking the beginning of Cycle II (upper bed temperature profile). It is well within the skill of the an to maximize the upper catalytic bed reaction temperature which will be influenced by the feedstream composition, the concentration of the oxidizable components in the feedstream, the flow rate of the feedstream, and the composition of the catalyst, etc.

When the desired operating temperature is reached in the upper unit, the adsorbed TCE is desorbed by slow heating (beginning of Cycle I, lower heating temperature profile) of the lower unit until a predetermined desorption temperature is reached, which once again for ease of experimentation, is the same as the temperature in the upper bed, although there is no need to make the temperatures identical. The desorption temperatures will typically be lower than the oxidative temperatures. Once again, the rate of heating of the lower bed and the final lower bed temperature, will be affected by the amount of material adsorbed by the lower bed, the composition of the lower bed, the desorption characteristics of the adsorbed material, the catalyst composition of the upper bed, the temperature of the upper bed, the flow rates in the system, etc.

When the TCE concentration at the outlet of the sorption unit, as determined at the middle sampling port, is essentially negligible, the lower unit heating is mined off, thereby permitting the sorption bed to return to room temperature. This marks the end of Cycle I, the heating/cooling cycle for the lower reaction bed. At a point either subsequent to, or simultaneous with, or in some specialized situations, even prior to, the end of Cycle I, the heating of the upper catalytic bed is terminated, thereby ending Cycle II.

Exemplary of heating rates which were employed in the experiments which are summarized in Table I, and as shown in FIGS. 7-10, $\sim 4°$ C.–$10°$ C./rain would be illustrative, but by no means limiting, in that equipment and/or catalyst composition will play a larger role in determining the optimal heating rates employed. When dilute VOC streams are used, heating rates of $\sim 1°$ C./min or lower would be certainly contemplated.

EXAMPLES

The following specific examples detail the best mode known to the applicant at the time of filing this application. It is envisioned that better modes of operation and/or catalysts may be developed subsequently and are to be considered as a part of this specification thereof insofar as they come within the scope of the claims.

Example #1

Figure 3:
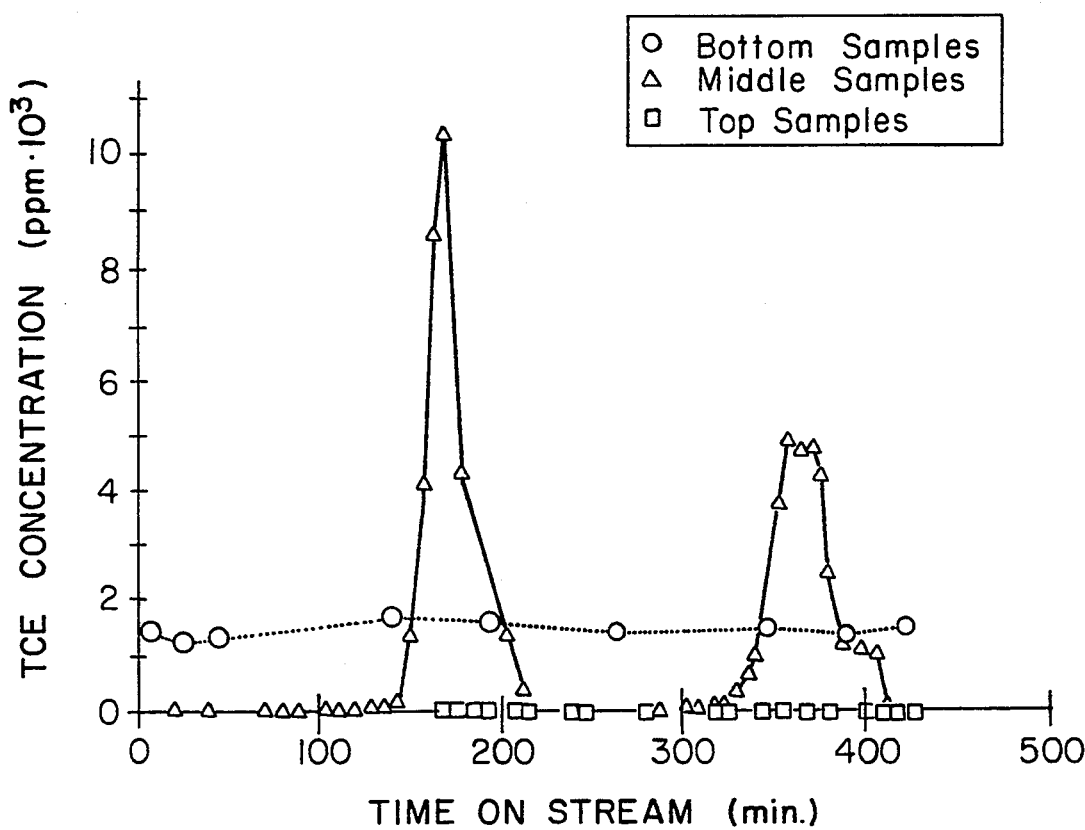
FIG. 3 is an on-stream profile from a reactor as shown in FIG. 2 using TCE feedstock (1450 ppm) and a 50% Silicalite/CA+50% Cr-Y/Co sorbent/catalyst, showing samples obtained from the top, middle and bottom of the reactor.

In Table I, as additionally graphically represented in FIG. 3, two reactor beds, were used employing Silicalite/CA (50%) and Cr-Y/Co (50%), $\sim 5.5$ grams of this mixture being used in each bed. The reaction temperature was 455° C., the TCE concentration was 1450 ppm, $\sim 14,000$ ppm water vapor at a space velocity of 2360 $hr^{-1}$ comprised the reaction stream. This illustrates the fact that a single composition can be effectively used as both a sorbent for the initial feedstream, and can function simultaneously as a catalyst. This situation would additionally work well in a single bed reactor setup as shown in FIG. 2. The heating times for Cycles I and II were 52% and 61% respectively, with 100% representing heating all of the time. As shown in FIG. 3, the TCE feedstream was constantly monitored through periodic monitoring through the bottom sampling port, and indicated the relatively constant composition of the TCE component of the feedstream. As the bottom catalyst bed became saturated, the composition of the lower bed effluent, as measured by the middle sampling port, indicated breakthrough TCE.

Figure 7:
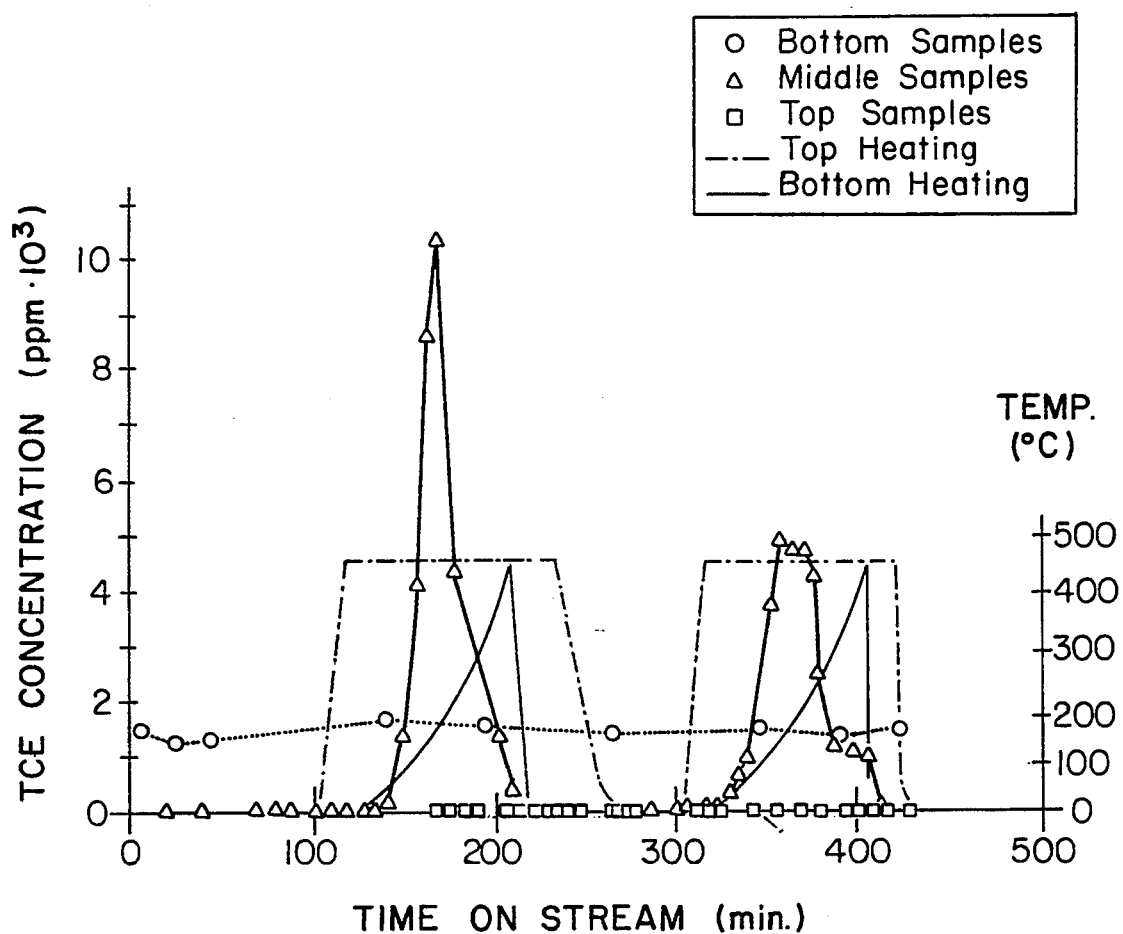
FIG. 7 is an on-stream profile using the system of FIG. 3 and additionally showing heating cycles of both the top and bottom reactors.

FIG. 7, is a duplicate of FIG. 3, except for the addition of top and bottom heating profiles as measured by the second Y axis. At a point prior to the detection of breakthrough TCE, the top reactor is heated, thereby anticipating the need for catalytic oxidation of TCE as the absorption capacity of the lower bed is exceeded. At a point subsequent to the final upper bed temperature (455° C.), or in close proximity to this operating temperature, the lower bed temperature is slowly ramped to about the same operating temperature as the upper bed, although there is no need or implication that the two temperatures be identical. In fact, the desorption temperature will generally be lower than the oxidation temperature. The reason for the slow ramping is typically due to the fact that as shown in both FIGS. 3 and 7, immediately subsequent to the application of heat to the lower bed, TCE is quickly desorbed from the lower bed. If the ramping is too rapid, then the upper catalyst bed would be flooded with TCE, with the possibility of TCE breakthrough on the upper bed, an undesirable result As all of the absorbed TCE is desorbed, as illustrated by the fall in TCE concentration as measured by the middle sampling port, the bottom reactor heating is turned off and allowed to cool back to ambient temperature. The heating profile is typically allowed to remain on for a small period of time to insure the destruction of all TCE, and then turned off to allow the upper reactor temperature to return to ambient. It is of come possible, to mm off the upper and lower furnaces concurrently, the retained heat of the furnace being sufficient to oxidize any residual TCE in the upper bed.

Example #2

Figure 4:
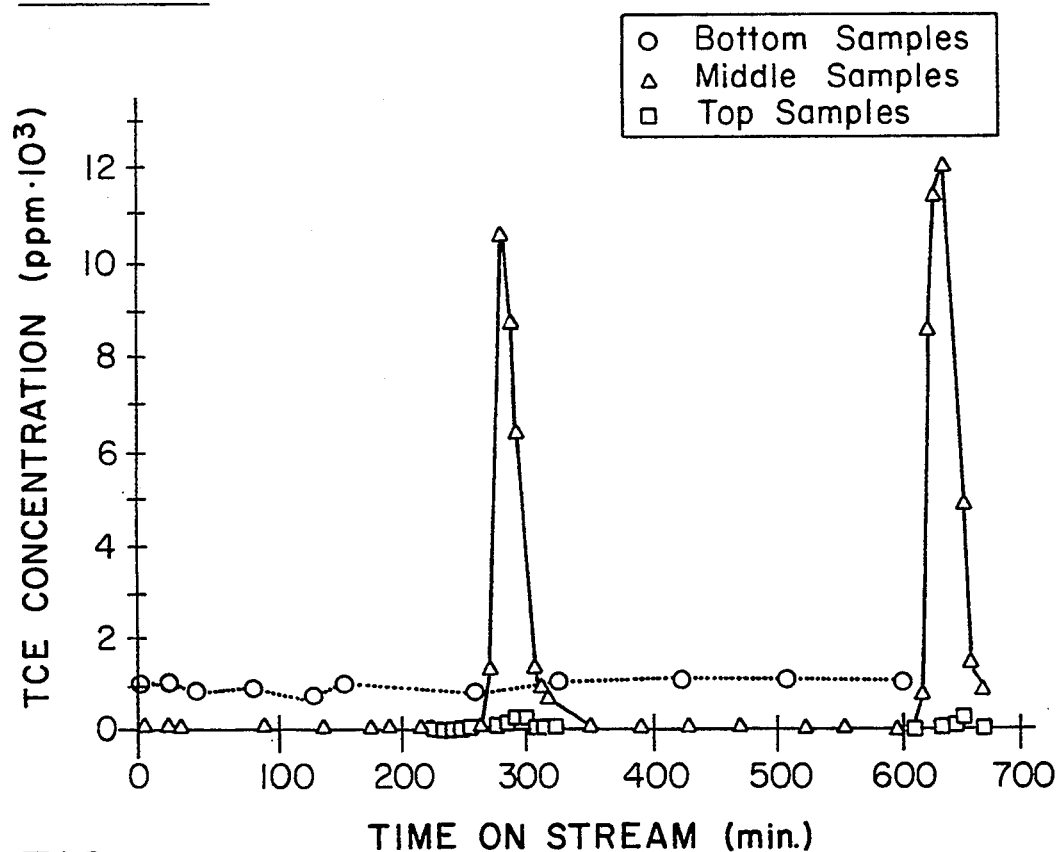
FIG. 4 is an on-stream profile from a reactor as shown in FIG. 2 using TCE feedstock (1050 ppm) and a Silicalite sorbent in the bottom bed and Cr-Y/Pt catalyst in the top bed, showing samples obtained from the top, middle and bottom of the reactor.

Run #2, shown graphically in FIG. 4, illustrates the ability to maximize the functions of both sorbent and catalyst by using Silicalite ($\sim 8.8$ g) in the bottom bed, a good sorbent, with Cr-Y/Pt ($\sim 8.7$ g) in the upper bed, a good catalyst. It was easily seen that this optimized situation permitted the reaction temperature to be lowered to 368° C. and the Cycle I and II heating times to be lowered to 34% and 26% respectively using a TCE concentration of 1061 ppm in the feedstream, the space velocity and water vapor content being held constant.

Figure 8:
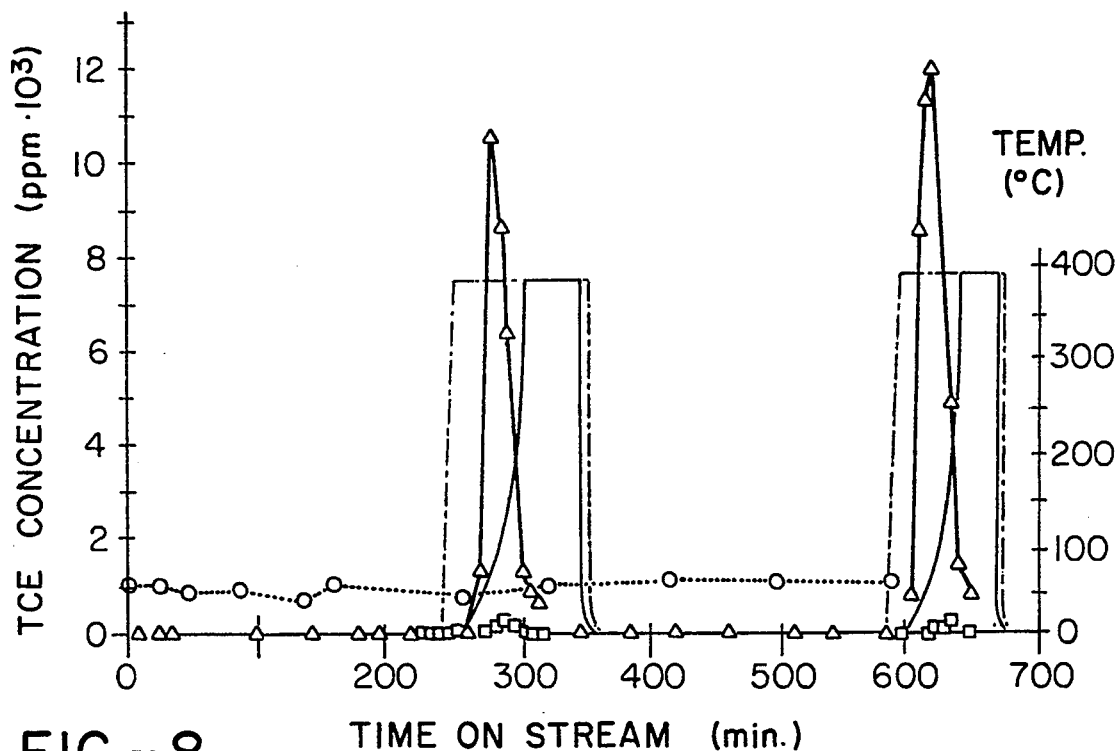
FIG. 8 is an on-stream profile using the system of FIG. 4 and additionally showing heating cycles of both the top and bottom reactors.

Analogous temperature profiles to that described with Example #1 apply to this example and are shown in FIG. 8. In the single bed reactor, as shown in FIG. 2, this would be achieved by the use of a compositionally graduated bed, with 100% Silicalite at the base of the bed, progressing up to 100% Cr-Y/Pt at the top of the bed. The composition can change either uniformly or non-uniformly, as the specifics of the application demand.

Example #3

Figure 5:
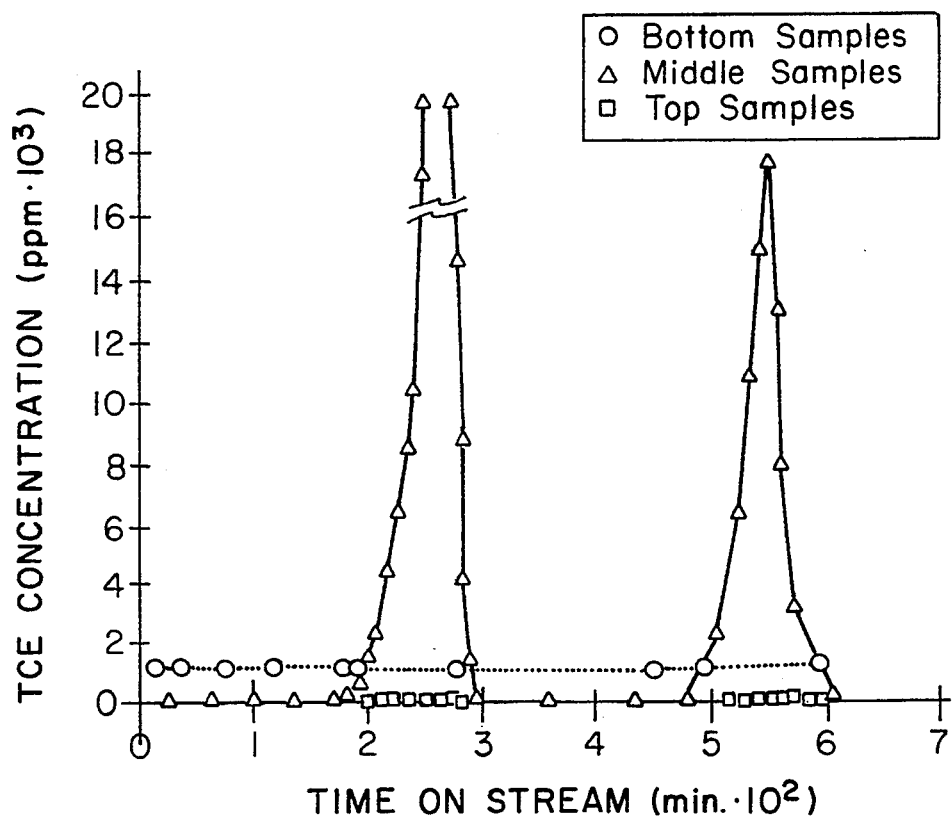
FIG. 5 is an on-stream profile from a reactor as shown in FIG. 2 using TCE feedstock (1062) and a Silicalite/CA sorbent in the bottom bed and Cr-Y/Pt catalyst in the top bed, showing samples obtained from the top, middle and bottom of the reactor.

Run #3, shown graphically in FIG. 5, illustrates the ability to use a modest catalyst and sorbent Silicalite/CA in the lower unit and Cr-Y/Pt, preferred catalyst but somewhat poor sorbent, in the upper unit in mounts similar to that described previously for Example #2. It is once again seen that the reaction temperature can be maintained at a relatively low temperature (375° C.), while the Cycle I and II heating times are still fairly short, 36% for both, using 1062 ppm TCE in the feedstream at the previously reported values of the water vapor content and space velocity.

Figure 9:
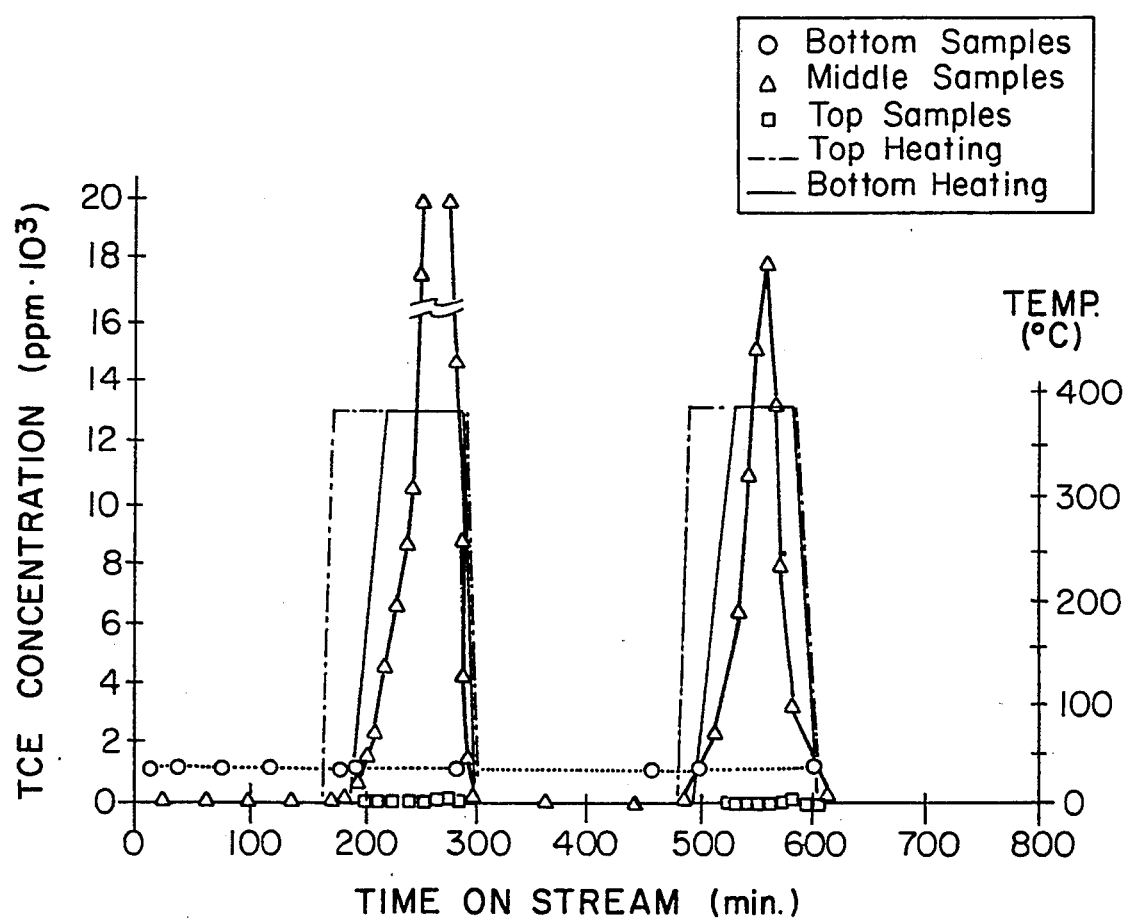
FIG. 9 is an on-stream profile using the system of FIG. 5 and additionally showing heating cycles of both the top and bottom reactors.

Analogous temperature profiles to that described with Examples #1 and #2 apply to this example and are shown in FIG. 9. In the single bed reactor, as shown in FIG. 2, this would be achieved by the use of a compositionally graduated bed, with 100% Silicalite/CA at the base of the bed, progressing up to 100% Cr-Y/Pt at the top of the bed. The composition can change either uniformly or nonuniformly, as the specifics of the application demand.

Example #4

Figure 6:
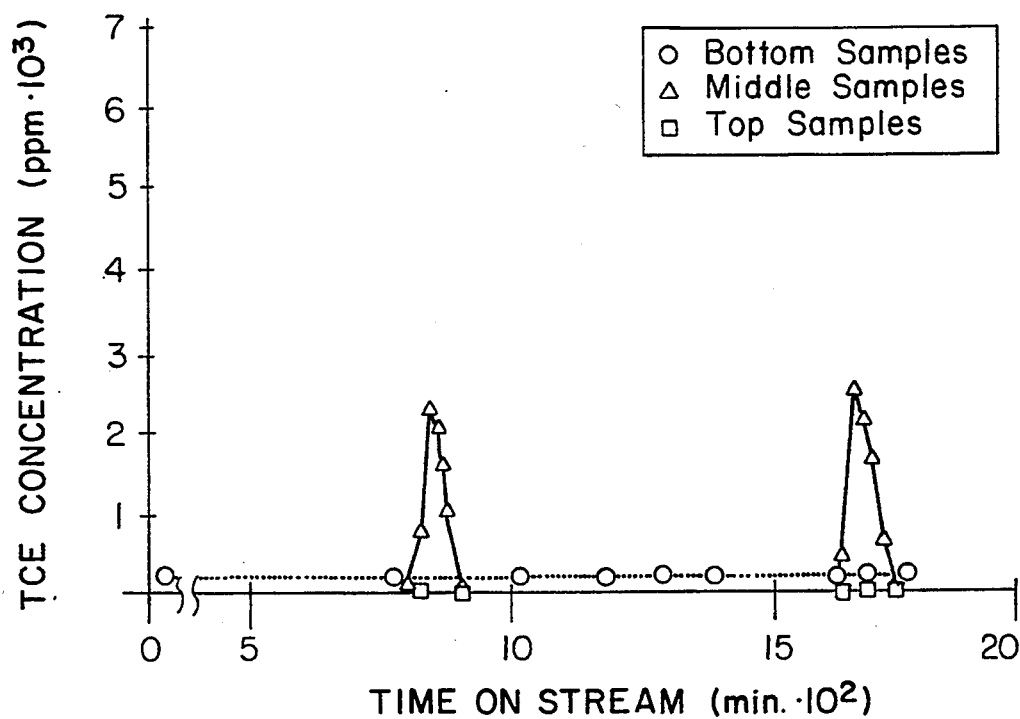
FIG. 6 is an on-stream profile from a reactor as shown in FIG. 2 using TCE feedstock (237 ppm) and a Silicalite/CA sorbent in the bottom bed and Cr-Y/Pt catalyst in the top bed, showing samples obtained from the top, middle and bottom of the reactor.

Run #4, shown graphically in FIG. 6, is identical to Example #3, (Run #3) except that the TCE concentration is 237 ppm. This attempts to reflect a more typical TCE concentration, which would generally be in the range of 20–30 ppm. Even though the TCE concentration [237 ppm] is still an order of magnitude greater than would normally be encountered in the field, the heating cycles can be further reduced to 15%, thereby indicating that large energy savings are possible in commercial applications, with heating percentages being as low as 1–2%.

Figure 10:
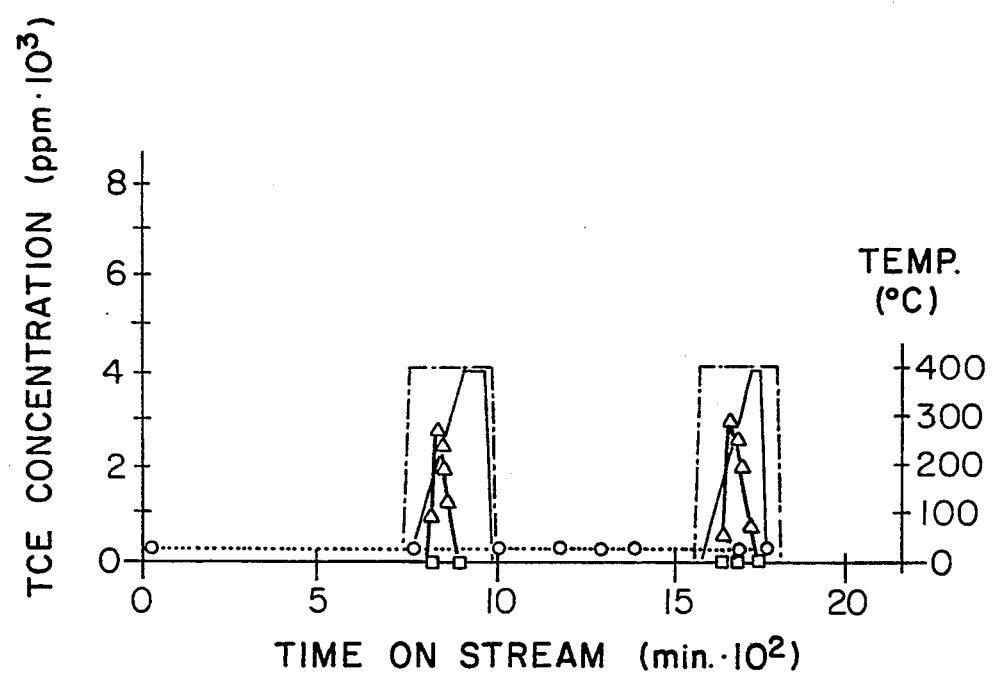
FIG. 10 is an on-stream profile using the system of FIG. 6 and additionally showing heating cycles of both the top and bottom reactors.

Analogous temperature profiles to that described with Examples #1, #2 and #3 apply to this example and are shown in FIG. 10. In the single bed reactor, as shown in FIG. 2, this would be achieved by the use of a compositionally graduated bed, with 100% Silicalite/CA at the base of the bed, professing up to 100% Cr-Y/Pt at the top of the bed. The composition can change either uniformly or nonuniformly, as the specifics of the application demand.

Example #5

Run #5, illustrates the ability to use a chromium exchanged ZSM-5-based zeolite in both the sorption and catalytic unit The reaction temperature was maintained at a relatively low temperature (370° C.), while the Cycle I and II heating times are approximately half the required cycle times when using Silicalite, a good sorbent, with Cr-Y/Pt, a good catalyst, which maximized the respective functions of the sorbent/catalyst.

Analogous temperature profiles to that described previously were used. This example illustrates the best mode known to the applicant as of the time of filing of the application, in that it is most suitable for a single bed reactor, and the composition of the catalyst can be uniform throughout the bed, thereby facilitating the reactor loading.

TABLE I

| Run No. | Sorption Unit Catalyst | Catalysis Unit Catalyst | Reaction Temperature (°C.) | Heating Time (%) I cycle | Heating Time (%) II cycle | TCE Concentration (ppm) |
|---|---|---|---|---|---|---|
| 1 | Silicalite/CA (50%) Cr—Y/Co (50%) | Silicalite/CA (50%) Cr—Y/Co (50%) | 455 | 52 | 61 | 1450 |
| 2 | Silicalite | Cr—Y/Pt | 368 | 34 | 26 | 1061 |
| 3 | Silicalite/CA | Cr—Y/Pt | 375 | 36 | 36 | 1062 |
| 4 | Silicalite/CA | Cr—Y/Pt | 373 | 15 | 15 | 237 |
| 5 | Cr-ZSM-5 | Cr-ZSM-5 | 370 | 16 | 17 | 1040 |

Note: (1) All runs were carried out in the presence of ~14000 ppm water and a space velocity of 2360 hr$^{-1}$ The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for the oxidation of halogenated organic compounds which comprises:
   (a) adsorbing at least one organic compound in at least a first catalyst capable of adsorbing the organic compound at an adsorption temperature;
   (b) heating at least one second catalyst downstream of the first catalyst from an initial temperature to an oxidation temperature, the second catalyst capable of oxidizing the organic compound when heated to the oxidation temperature;
   (c) heating the first catalyst to a desorption temperature at a rate which will permit the complete oxidation of the desorbed organic compound by the second catalyst at the oxidation temperature;
   (d) cooling the first catalyst to the first adsorption temperature; and
   (e) cooling the second catalyst to the initial temperature.

2. The process of claim 1 wherein the adsorption temperature of the first catalyst and the initial temperature of the second catalyst is an ambient temperature.

3. The process of claim 2 wherein the oxidation temperature of the second catalyst and the desorption temperature of the first catalyst is from about 150° C. to about 600° C.

4. The process of claim 3 wherein the oxidation temperature of the second catalyst and the desorption temperature of the first catalyst is from about 320° C. to about 400° C.

5. A process for the oxidation of halogenated organic compounds which comprises:
   (a) adsorbing at least one organic compound in a first segment of a sorbent/catalyst bed at an adsorption temperature, the first segment of the bed being positioned at an inlet end for the organic compounds, the sorbent/catalyst having a higher concentration of sorbent than catalyst in the first segment thereby being capable of adsorbing the organic compound in the first segment;
   (b) heating an opposite second segment of a sorbent/catalyst bed, downstream of the first segment of the sorbent/catalyst, from an initial temperature to an oxidation temperature, the second segment sorbent/catalyst having a higher concentration of the catalyst than sorbent in the second segment thereby being capable of oxidizing the organic compound in the second segment;
   (c) heating the first segment of the sorbent/catalyst bed to a desorption temperature at a rate which will permit the complete oxidation of the desorbed organic compound by the second segment of the sorbent/catalyst bed at the oxidation temperature;
   (d) cooling the first segment of the sorbent/catalyst bed to the first adsorption temperature; and (e) cooling the second segment of the sorbent/catalyst bed to the initial temperature.

6. The process of claim 5 wherein the adsorption temperature of the first segment of the sorbent/catalyst bed and the initial temperature of the second segment of the sorbent/catalyst bed is an ambient temperature.

7. The process of claim 6 wherein the oxidation temperature of the second segment of the sorbent/catalyst bed and the desorption temperature of the first segment of the sorbent/catalyst bed is from about 150° C. to about 600° C.

8. The process of claim 7 wherein the oxidation temperature of the second segment of the sorbent/catalyst bed and the desorption temperature of the first segment of the sorbent/catalyst bed is from about 320° C. to about 400° C.

9. A process for the oxidation of halogenated organic compounds which comprises:
 (a) adsorbing at least one volatile organic compound in a first segment of a sorbent/catalyst bed at an adsorption temperature, the first segment of the bed being positioned at an inlet end for the organic compounds, the sorbent/catalyst having a higher concentration of sorbent than catalyst in the first segment thereby being capable of adsorbing the organic compound in the first segment;
 (b) heating an opposite second segment of a sorbent/catalyst bed, downstream of the first segment of the sorbent/catalyst, from an initial temperature to an oxidation temperature, the second segment sorbent/catalyst having a higher concentration of the catalyst than sorbent in the second segment thereby being capable of oxidizing the organic compound in the second segment;
 (c) progressively heating segments of the sorbent/catalyst bed from the second segment of the sorbent/catalyst bed to the first segment of the sorbent/catalyst bed to at least a desorption temperature at a rate which will permit the complete oxidation of the desorbed organic compound by the second segment of the sorbent/catalyst bed at the oxidation temperature;
 (d) progressively cooling the sorbent/catalyst bed from the first segment of the sorbent/catalyst bed to a first adsorption temperature; and
 (e) cooling the second segment of the sorbent/catalyst bed to the initial temperature.

10. The process of claim 9 wherein the adsorption temperature of the first segment of the sorbent/catalyst bed and the initial temperature of the second segment of the sorbent/catalyst bed is an ambient temperature.

11. The process of claim 10 wherein an oxidation temperature of the second segment of the sorbent/catalyst bed and the desorption temperature of the first segment of the sorbent/catalyst bed is from about 150° C. to about 600° C.

12. The process of claim 11 wherein the oxidation temperature of the second segment of the sorbent/catalyst bed and the desorption temperature of the first segment of the sorbent/catalyst bed is from about 320° C. to about 400° C.

13. A process for the oxidation of halogenated organic compounds using a sorbent/catalyst which is a combined metal-exchanged, metal-impregnated aluminosilicate zeolite sorbent/catalyst having sorption and oxidation segments for the initial adsorption followed by catalytic oxidation of organic compounds wherein the sorbent/catalyst comprises:

(a) an adsorption segment for the initial adsorption of the compounds, the segment comprising at least an aluminosilicate-based zeolite; and
 (b) a catalytic segment for the subsequent catalytic oxidation of the compounds, the catalytic segment being selected from the group consisting of at least one metal-exchanged aluminosilicate zeolite having at least one exchanged metal, at least one metal-impregnated aluminosilicate zeolite having at least one impregnated metal, and at least one metal-exchanged metal-impregnated aluminosilicate zeolite having at least one exchanged metal and at least one impregnated metal, and wherein the exchanged metal is selected from the group consisting of Ti, V, Cr, Co, Ni, Cu, Fe, Mo, Mn, Pt and Pd, and wherein the impregnated metal is selected from the group consisting of Ti, V, Cr, Mn, Co, Ni, Cu, Fe, Mo, Mn, Pd and Pt, and wherein the process comprises the steps of:
 (a) adsorbing at least one organic compound in a first segment of a sorbent/catalyst bed at an adsorption temperature, the first segment of the bed being positioned at an inlet end for the organic compounds, the sorbent/catalyst having a higher concentration of sorbent than catalyst in the first segment thereby being capable of adsorbing the organic compound in the first segment;
 (b) heating an opposite second segment of a sorbent/catalyst bed, downstream of the first segment of the sorbent/catalyst, from an initial temperature to an oxidation temperature, the second segment sorbent/catalyst having a higher concentration of the catalyst than sorbent in the second segment thereby being capable of oxidizing the organic compound in the second segment;
 (c) progressively heating segments of the sorbent/catalyst bed from the second segment of the sorbent/catalyst bed to the first segment of the sorbent/catalyst bed to at least a desorption temperature at a rate which will permit the complete oxidation of the desorbed organic compound by the second segment of the sorbent/catalyst bed at the oxidation temperature;
 (d) progressively cooling the sorbent/catalyst bed from the first segment of the sorbent/catalyst bed to a first adsorption temperature; and
 (e) cooling the second segment of the sorbent/catalyst bed to the initial temperature.

14. A process for the oxidation of halogenated organic compounds using a sorbent/catalyst having sorption and oxidation segments for the initial adsorption followed by catalytic oxidation of organic compounds wherein the sorbent/catalyst comprises:
 (a) an adsorption segment for the initial adsorption of the compounds; and
 (b) a catalytic segment for the subsequent catalytic oxidation of the compounds, and wherein the process comprises the steps of:
 (a) adsorbing at least one volatile organic compound in a first segment of a sorbent/catalyst bed at an adsorption temperature, the first segment of the bed being positioned at an inlet end for the organic compounds, the sorbent/catalyst having a higher concentration of sorbent than catalyst in the first segment thereby being capable of adsorbing the organic compound in the first segment;

(b) heating an opposite second segment of a sorbent/catalyst bed, downstream of the first segment of the sorbent/catalyst, from an initial temperature to an oxidation temperature, the second segment sorbent/catalyst having a higher concentration of the catalyst than sorbent in the second segment thereby being capable of oxidizing the organic compound in the second segment;

(c) progressively heating segments of the sorbent/catalyst bed from the second segment of the sorbent/catalyst bed to the first segment of the sorbent/catalyst bed to at least a desorption temperature at a rate which will permit the complete oxidation of the desorbed organic compound by the second segment of the sorbent/catalyst bed at the oxidation temperature;

(d) progressively cooling the sorbent/catalyst bed from the first segment of the sorbent/catalyst bed to a first adsorption temperature; and (e) cooling the second segment of the sorbent/catalyst bed to the initial temperature.

15. A process for the oxidation of halogenated organic compounds using a single sorbent/catalyst composition having sorption and oxidation components, for the initial adsorption followed by catalytic oxidation of organic compounds wherein the sorbent/catalyst comprises:

(a) an adsorption component for the initial adsorption of the compounds; and (b) a catalytic component for the subsequent catalytic oxidation of the compounds, and wherein the process comprises the steps of:

(a) adsorbing at least one volatile organic compound in a first segment of the sorbent/catalyst bed at an adsorption temperature;

(b) heating an opposite second segment of the sorbent/catalyst bed, downstream of the first segment of the sorbent/catalyst, from an initial temperature to an oxidation temperature;

(c) heating the first segment of the sorbent/catalyst bed to at least a desorption temperature at a rate which will permit the complete oxidation of the desorbed organic compound by the second segment of the sorbent/catalyst bed at the oxidation temperature;

(d) cooling the first segment of the sorbent/catalyst bed to a first adsorption temperature; and (e) cooling the second segment of the sorbent/catalyst bed to the initial temperature.

16. The process of claim 15 wherein the adsorption temperature of the first segment and the initial temperature of the second segment is an ambient temperature.

17. The process of claim 16 wherein the oxidation temperature of the second segment and the desorption temperature of the first segment is from about 150° C. to about 600° C.

18. The process of claim 17 wherein the oxidation temperature of the second segment and the desorption temperature of the first segment is from about 320° C. to about 400° C.

* * * * *